(12) United States Patent
Naumann et al.

(10) Patent No.: US 11,230,034 B2
(45) Date of Patent: Jan. 25, 2022

(54) METHOD AND APPARATUS FOR PRODUCING AN AIRCRAFT STRUCTURAL COMPONENT

(71) Applicant: AIRBUS OPERATIONS GMBH, Hamburg (DE)

(72) Inventors: Niko Naumann, Hamburg (DE); Michaela Willamowski, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 960 days.

(21) Appl. No.: 13/887,706

(22) Filed: May 6, 2013

(65) Prior Publication Data

US 2014/0131917 A1 May 15, 2014

Related U.S. Application Data

(63) Continuation of application No. PCT/EP2011/005588, filed on Nov. 7, 2011.
(Continued)

(30) Foreign Application Priority Data

Nov. 8, 2010 (DE) ...................... 10 2010 050 740.7

(51) Int. Cl.
*B29C 43/20* (2006.01)
*B29C 33/12* (2006.01)
(Continued)

(52) U.S. Cl.
CPC ............ *B29C 33/12* (2013.01); *B29C 43/203* (2013.01); *B29C 43/58* (2013.01); *B29C 70/46* (2013.01);
(Continued)

(58) Field of Classification Search
CPC ...... B29C 70/543; B29C 70/46; B29C 43/203
See application file for complete search history.

(56) References Cited

U.S. PATENT DOCUMENTS 3,115,678 A * 12/1963 Keen ...................... B29C 51/145
                                                                                    264/322
4,792,481 A * 12/1988 O'Connor ................. B32B 5/28
                                                                                    427/177

(Continued)

FOREIGN PATENT DOCUMENTS

DE         100 27 557       4/2001
DE   10 2004 001 078       7/2005
(Continued)

OTHER PUBLICATIONS

International Search Report dated May 4, 2012.
(Continued)

*Primary Examiner* — Matthew J Daniels
(74) *Attorney, Agent, or Firm* — Dickinson Wright PLLC

(57) ABSTRACT

A method for producing an aircraft structural component includes the steps of introducing a plurality of semi-finished product layers for producing a component from a fibre-reinforced, thermoplastic plastic material into a compression mould, applying pressure to the stacked semi-finished product layers, the stacked semi-finished product layers being fixed, before pressure is applied, at particular points in their position in the compression mould and/or relative to one another in such a way that, while pressure is being applied to the semi-finished product layers stacked in the compression mould, a sliding movement of the semi-finished product layers relative to one another and/or relative to the compression mould, preventing wrinkling in the semi-finished product layers, takes place, and removing the aircraft structural component from the compression mould.

12 Claims, 2 Drawing Sheets

Related U.S. Application Data

(60) Provisional application No. 61/410,972, filed on Nov. 8, 2010.

(51) Int. Cl.

| | | |
|---|---|---|
| *B29C 70/46* | (2006.01) | |
| *B32B 37/00* | (2006.01) | |
| *B32B 37/10* | (2006.01) | |
| *B29C 70/54* | (2006.01) | |
| *B29C 43/58* | (2006.01) | |
| *B32B 37/20* | (2006.01) | |
| *B32B 37/08* | (2006.01) | |
| *B64F 5/10* | (2017.01) | |

(52) U.S. Cl.
CPC ........ *B29C 70/543* (2013.01); *B32B 37/0007* (2013.01); *B32B 37/10* (2013.01); *B32B 37/08* (2013.01); *B32B 37/203* (2013.01); *B32B 2305/07* (2013.01); *B32B 2309/02* (2013.01); *B32B 2309/10* (2013.01); *B32B 2309/72* (2013.01); *B32B 2605/18* (2013.01); *B64F 5/10* (2017.01); *Y02T 50/40* (2013.01)

(56) References Cited

U.S. PATENT DOCUMENTS

| | | | | |
|---|---|---|---|---|
| 4,961,700 A | * | 10/1990 | Dunbar | .................. B29C 43/36 264/257 |
| 5,095,833 A | * | 3/1992 | Darrieux | ................. B29C 70/24 112/2 |
| 5,361,483 A | * | 11/1994 | Rainville | ................. B29C 65/08 29/524.1 |
| 5,418,035 A | | 5/1995 | Iguchi | |
| 5,716,686 A | * | 2/1998 | Black | .................... B29B 15/122 264/134 |
| 6,162,314 A | * | 12/2000 | Kassuelke | ............... B29C 65/02 156/182 |
| 6,790,026 B2 | * | 9/2004 | Vandangeot | ............ B29C 43/18 425/112 |
| 2002/0027187 A1 | * | 3/2002 | Sato | ........................ B29C 70/44 249/187.1 |
| 2003/0175520 A1 | * | 9/2003 | Grutta | .................... B29C 70/46 428/411.1 |
| 2004/0142143 A1 | * | 7/2004 | Corden | ................. B29C 70/541 428/103 |
| 2007/0175575 A1 | * | 8/2007 | Rubin | ................... B29C 70/504 156/221 |
| 2010/0189988 A1 | * | 7/2010 | Custer | ........................ C08J 5/24 428/304.4 |
| 2011/0011518 A1 | * | 1/2011 | Carstensen | ............... B64C 1/06 156/91 |
| 2011/0115128 A1 | | 5/2011 | Bochinger | |
| 2012/0067509 A1 | | 3/2012 | Kurtz | |

FOREIGN PATENT DOCUMENTS

| | | |
|---|---|---|
| DE | 10 2007 062 111 | 7/2009 |
| DE | 10 2008 020 347 | 11/2009 |
| EP | 0 319 895 | 6/1989 |
| EP | 1 749 631 | 2/2007 |
| WO | 2010/097547 | 9/2010 |

OTHER PUBLICATIONS

F. Campbell, "Thermoplastic Composites," Manufacturing Technology for Aerospace Structural Materials, XP055016277, Aug. 1, 2006, pp. 343-361.

\* cited by examiner

METHOD AND APPARATUS FOR PRODUCING AN AIRCRAFT STRUCTURAL COMPONENT

CROSS REFERENCE TO RELATED APPLICATIONS

This application is a bypass continuation of PCT/EP2011/005588 filed Nov. 7, 2011 which is entitled to and claims the benefit of German Application No. DE 10 2010 050 740.7 filed Nov. 8, 2010 and U.S. Provisional Application No. 61/410,972, filed Nov. 8, 2010, the disclosures of each of which, including the specification, claims, drawings and abstract, are incorporated herein by reference in their entirety.

FIELD

The invention relates to a method and an apparatus for producing a large-area aircraft structural component from a composite material with a matrix made of a thermoplastic plastic material.

BACKGROUND

In aircraft construction, efforts are being made to use as load-bearing components increasingly components which are composed wholly or partly of fibre-reinforced composite materials, for example carbon fibre-reinforced plastics (CFRP). For example, DE 10 2007 062 111 A1 describes a transverse support structure which is composed of carbon fibre-reinforced plastic and serves to support the individual panels of an aircraft floor system for separating a passenger cabin from a cargo compartment arranged below the passenger cabin. Furthermore, it is known, for example from DE 10 2004 001 078 A1; to provide aircraft fuselage segments with a skin which is designed with a sandwich construction and made of fibre-reinforced composite materials.

To produce aircraft structural components from fibre-reinforced composite materials, as a rule a multilayer laminate is firstly built up from fibre prepregs. The fibre prepregs comprise a woven fabric or laid scrim of reinforcing fibres provided with a surface layer made of an uncured, thermoset plastic material, for example an epoxy resin material. The laminate can be built up manually or in an automated manner. Subsequently, the thermoset plastic material deposited on the surfaces of the fibres is cured in an autoclave cycle under pressure and/or elevated temperature, so that a composite material with a matrix made of cured thermoset plastic and reinforcing fibres embedded in the matrix is obtained.

The autoclave method used to produce the aircraft structural components is time-consuming and, owing to the need to create a vacuum therefor, involves high cost and consumption of auxiliary materials. Moreover, in the case of composite materials with a matrix made of a thermoset plastic material, there is always the risk that, during the curing process, which, once initiated, is no longer reversible, pores or stresses may arise in the matrix of the composite material, necessitating reworking or repair of the components. In the worst case, defects in the curing process can even result in the component no longer being usable and having to be discarded as a reject.

Unlike in thermoset plastic materials, no crosslinking reaction takes place in thermoplastic plastic materials. Rather, the consolidation of thermoplastic plastic materials is reversible, i.e. these materials can be transformed into a plastically deformable state again as often as desired by heating. Efforts are therefore being made also in aircraft construction to use fibre-reinforced composite materials with a thermoplastic matrix and process them by hot pressing. However, when hot-pressing relatively large components made of fibre-reinforced composite materials with a thermoplastic matrix, the problem of wrinkling in the fibre layers to be compressed frequently occurs. This gives rise to component defects which may considerably reduce the loadability of the components. This is not tolerable particularly in the case of primary structural components, which are subject to particularly high requirements with regard to their loadability.

SUMMARY

The invention is directed at the object of specifying a method and an apparatus for producing a large-area aircraft structural component from a composite material with a matrix made of a thermoplastic plastic material.

This object is achieved by a method having features of attached claims and an apparatus having features of attached claims.

In the case of a method for producing an aircraft structural component according to the invention, firstly a plurality of semi-finished product layers for producing a component from a fibre-reinforced, thermoplastic plastic material are introduced into a compression mould. The semi-finished product layers can contain reinforcing fibres which are unidirectionally arranged or present in the form of laid scrims or woven fabrics. Carbon fibres, but also other suitable fibres, such as for example glass fibres, can be used as the reinforcing fibres, which can be formed as short fibres or continuous fibres. The reinforcing fibres are preferably provided with a surface layer made of a thermoplastic plastic material. Suitable plastic materials are, for example, polyetherketones, polyphthalamide or polyphenylene sulfide. The introduction of the semi-finished product layers into the compression mould for building up a laminate can take place manually or in an automated manner.

Pressure is applied to the stacked semi-finished product layers, the stacked semifinished product layers being fixed, before pressure is applied, at particular points in their position in the compression mould and/or relative to one another in such a way that, while pressure is being applied to the semi-finished product layers stacked in the compression mould, a sliding movement of the semi-finished product layers relative to one another and/or relative to the compression mould, preventing wrinkling in the semi-finished product layers, takes place. In other words, the semifinished product layers are fixed merely at particular point in their position in the compression mould and/or relative to one another in such a way that they are still sufficiently movable relative to one another and/or relative to the compression mould in order to prevent wrinkling in the semi-finished product layers during the compression of the semi-finished product layers. The compression of the semifinished product layers results in an aircraft structural component made of a composite material with a matrix made of a thermoplastic plastic material and reinforcing fibres embedded in the matrix. The aircraft structural component is removed from the compression mould.

The aircraft structural component can be produced in a merely single-stage compression process. Alternatively to this, however, a plurality of compression steps can also be carried out, in which case at least during a first compression step the above-described fixing of the semi-finished product layers at particular points relative to one another and/or relative to the compression mould then takes place.

The method according to the invention enables the production of aircraft structural components with a large area, i.e. an area up to 7-20 m×2-4 m, from a composite material with a matrix made of a thermoplastic plastic material, the shaping of the aircraft structural components being able to take place without an autoclave by compression. As a result, the fabrication cost, fabrication time and auxiliary material requirement during the production of the components can be considerably reduced in comparison with components made of fibre-reinforced composite materials with a thermoset matrix. Moreover, fibre-reinforced composite materials with a thermoplastic matrix are distinguished by good impact behaviour and favourable moisture absorption properties. Finally, semi-finished products for producing fibre-reinforced composite materials with a thermoplastic matrix do not have to be cooled, like semi-finished products for producing fibre-reinforced composite materials with a thermoset matrix, but can be stored at room temperature. The method according to the invention can be used for producing plane and curved aircraft structural components, such as for example fuselage and wing shells.

The stacked semi-finished product layers can be fixed, before pressure is applied, at particular points in their position in the compression mould and/or relative to one another in a central region and/or a marginal region of the semi-finished product layers. In order to fix the semi-finished product layers at particular points in their position in the compression mould and/or relative to one another, suitable clamps or clips can be used. Alternatively to this, in particular it is possible to fix the semifinished product layers relative to one another by an adhesively bonded connection at particular points. The adhesively bonded connection can be produced by local fusing-on of the thermoplastic surface layers deposited on the reinforcing fibres of the semi-finished product layers.

Preferably, the pressure applied to the stacked semi-finished product layers is controlled in such a way that, during a first, initial pressure-applying phase, a pressure applied to a central region of the stacked semi-finished product layers is higher than a pressure applied to a marginal region of the stacked semi-finished product layers. The marginal region of the stacked semi-finished product layers can also be kept completely unpressurised during the first pressure-applying phase. By such a pressure control, the risk of wrinkling in the semi-finished product layers during compression can be further reduced.

Furthermore, the pressure applied to the stacked semi-finished product layers can be controlled in such a way that, during the first pressure-applying phase, the pressure applied to the stacked semi-finished product layers decreases continuously or discontinuously from the central region of the stacked semi-finished product layers in the direction of the marginal region of the stacked semi-finished product layers. In other words, if desired, during the first pressure-applying phase a continuous or discontinuous pressure distribution profile can be set over the surface of the semifinished product layers. The pressure distribution profile can be adapted, as required, to the materials to be processed and the shape and size of the aircraft structural components to be produced.

Preferably, the pressure applied to the stacked semi-finished product layers is controlled in such a way that, during a second pressure-applying phase following the first pressure-applying phase, a pressure applied to the marginal region of the stacked semi-finished product layers is increased in relation to the pressure applied to the marginal region of the stacked semi-finished product layers during the first pressure-applying phase. By increasing the pressure on the marginal region of the stacked semi-finished product layers only in the second pressure-applying phase following the first pressure-applying phase, it is ensured that any wrinkles in the semi-finished product layers can be pushed in the direction of the marginal region and thus removed from the semi-finished product layers.

The pressure applied to the stacked semi-finished product layers can also be controlled in such a way that the pressure applied to the stacked semi-finished product layers during the second pressure-applying phase is increased continuously or discontinuously from the central region of the stacked semi-finished product layers in the direction of the marginal region of the stacked semi-finished product layers. That is to say, during the second pressure-applying phase, a pressure distribution profile is produced over the surface of the semi-finished product layers which enables a "smoothing out" of any wrinkles in the semi-finished product layers in the direction of the marginal region of the semi-finished product layers.

Preferably, the pressure applied to the stacked semi-finished product layers is controlled in such a way that the pressure applied to the marginal region of the stacked semi-finished product layers during the second pressure-applying phase is increased until it corresponds to the pressure applied to the central region of the semi-finished product layers during the first pressure-applying phase. By such a pressure control, it is ensured that the semi-finished product layers are uniformly compressed over their entire surface.

The stacked semi-finished product layers are preferably heated to a temperature of 300 to 500° C. while pressure is being applied. Of course, the temperature control can be adapted to the materials of the semi-finished product layers to be processed and to the shape and size of the aircraft structural components to be produced.

If required, the semi-finished product layers can be pre-fixed, heated, preshaped and/or preconsolidated before being introduced into the compression mould. However, any pretreatment of the semi-finished product layers should be designed such that the shaping behaviour of the semi-finished product layers during compression is not impaired.

In a preferred embodiment of the method according to the invention, furthermore at least one semi-finished product layer for producing a stiffening element, for example a stringer or a frame, from a fibre-reinforced, thermoplastic plastic material is connected to the stacked semi-finished product layers for producing a component from a fibre-reinforced, thermoplastic plastic material. The connection of the at least one semi-finished product layer for producing a stiffening element to the stacked semi-finished product layers for producing a component can take place after the compression of the semi-finished product layers for producing a component. For example, the at least one semi-finished product layer for producing a stiffening element after the compression of the semi-finished product layers for producing a component can be deposited on a surface of the semi-finished product layers for producing a component which are compressed together, and a contact region of the layers can then be locally heated in order to connect the layers to one another.

Alternatively to this, the at least one semi-finished product layer for producing a stiffening element after the compression of the semi-finished product layers for producing a component can also be inserted into the compression mould and connected to the semi-finished product layers for producing a component by a further compression step. Finally, a single-stage compression process is also conceivable, i.e. the at least one semi-finished product layer for producing a stiffening element and the semi-finished product layers for producing a component can also be connected to one another in a single compression step. If the at least one semi-finished product layer for producing a stiffening element and the semifinished product layers for producing a component are to be connected to one another by one compression step, preferably a compression mould which comprises a receiving space for receiving the at least one semi-finished product layer for producing a stiffening element is used. This enables a uniform application of pressure to the semi-finished product layers.

An apparatus for producing an aircraft structural component according to the invention comprises a compression mould for receiving a plurality of semi-finished product layers for producing a component from a fibre-reinforced, thermoplastic plastic material. Furthermore, the apparatus comprises a pressure-applying device for applying pressure to the stacked semi-finished product layers. A fixing device is adapted to fix the stacked semi-finished product layers, before pressure is applied, at particular points in their position in the compression mould and/or relative to one another in such a way that, while pressure is being applied to the semi-finished product layers stacked in the compression mould, a sliding movement of the semifinished product layers relative to one another and/or relative to the compression mould, preventing wrinkling in the semi-finished product layers, takes place.

The fixing device is preferably adapted to fix the stacked semi-finished product layers, before pressure is applied, at particular points in their position in the compression mould and/or relative to one another in a central region and/or a marginal region of the semi-finished product layers. In order to fix the semi-finished product layers at particular points in their position in the compression mould and/or relative to one another, fixing devices in the form of clamps or clips can be used. Alternatively to this, the fixing device can also be formed by an adhesively bonded connection at particular points which fixes the semi-finished product layers at particular points relative to one another. The adhesively bonded connection can be produced, for example, by local fusing-on of the thermoplastic surface layers deposited on the reinforcing fibres of the semi-finished product layers.

The apparatus preferably comprises a control device which is adapted to control the pressure applied to the stacked semi-finished product layers in such a way that, during a first pressure-applying phase, a pressure applied to a central region of the stacked semi-finished product layers is higher than a pressure applied to a marginal region of the stacked semi-finished product layers.

Furthermore, the control device can be adapted to control the pressure applied to the stacked semi-finished product layers in such a way that, during the first pressure-applying phase, the pressure applied to the stacked semi-finished product layers decreases continuously or discontinuously from the central region of the stacked semi-finished product layers in the direction of the marginal region of the stacked semi-finished product layers.

The control device can furthermore be adapted to control the pressure applied to the stacked semi-finished product layers in such a way that, during a second pressure-applying phase following the first pressure-applying phase, a pressure applied to the marginal region of the stacked semi-finished product layers is increased in relation to the pressure applied to the marginal region of the stacked semi-finished product layers during the first pressure-applying phase.

Preferably, the control device is furthermore adapted to control the pressure applied to the stacked semi-finished product layers in such a way that the pressure applied to the stacked semi-finished product layers during the second pressure-applying phase is increased continuously or discontinuously from the central region of the stacked semi-finished product layers in the direction of the marginal region of the stacked semi-finished product layers.

Finally, the control device can be adapted to control the pressure applied to the stacked semi-finished product layers in such a way that the pressure applied to the marginal region of the stacked semi-finished product layers during the second pressure-applying phase is increased until it corresponds to the pressure applied to the central region of the semi-finished product layers during the first pressure-applying phase.

The apparatus can furthermore comprise a heating device which is adapted to heat the stacked semi-finished product layers to a temperature of 300 to 500° C. while pressure is being applied. Furthermore, a cooling device which is designed to cool the aircraft structural component before it is removed from the compression mould can be present.

The apparatus can comprise a local heating device for local heating of a contact region between at least one semi-finished product layer for producing a stiffening element from a fibre-reinforced, thermoplastic plastic material and the stacked semifinished product layers for producing a component from a fibre-reinforced, thermoplastic plastic material. Furthermore, the compression mould can be provided with a receiving space for receiving at least one semi-finished product layer for producing a stiffening element from a fibre-reinforced, thermoplastic plastic material.

BRIEF DESCRIPTION OF DRAWINGS

A preferred embodiment of the invention will now be explained in more detail with the aid of the appended schematic drawings, of which

DETAILED DESCRIPTION

Figure 1:
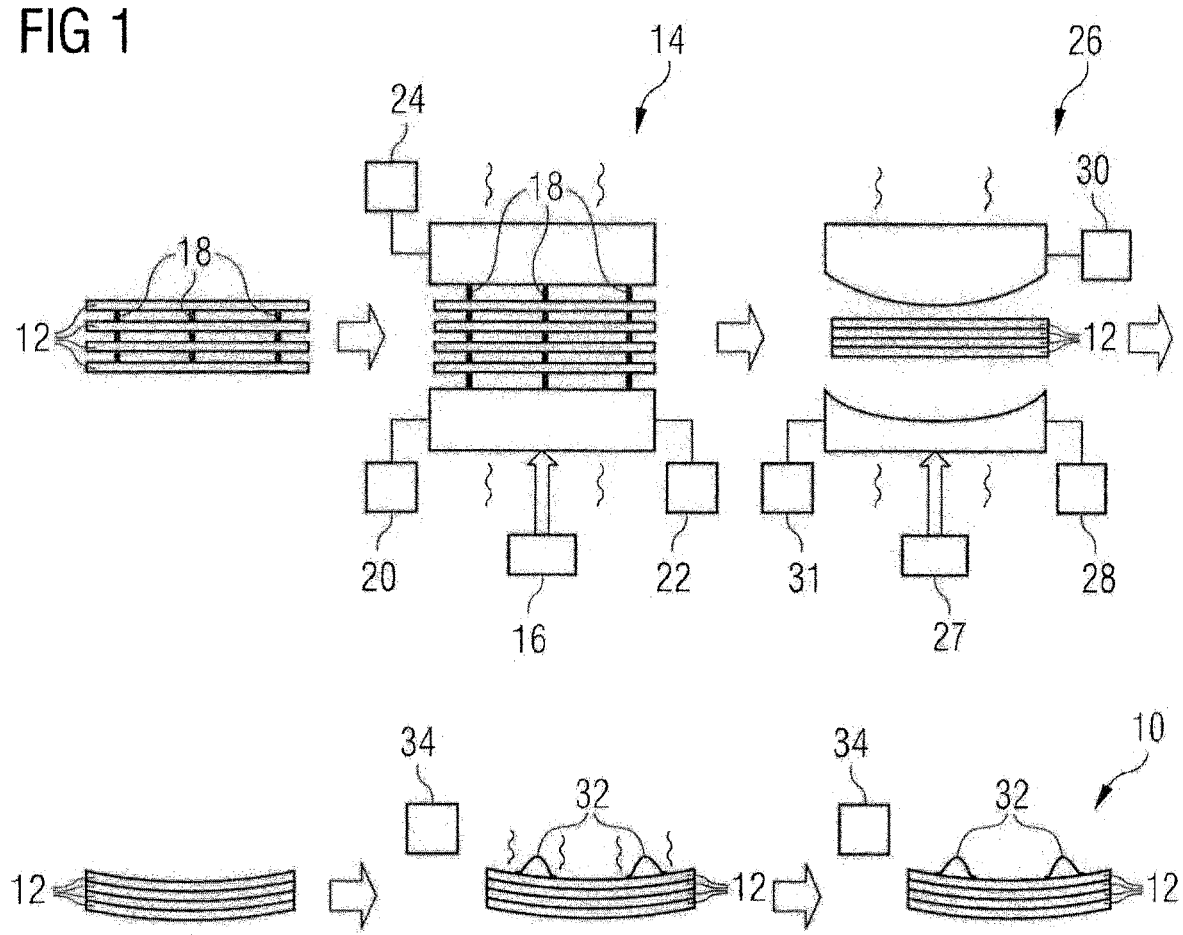
FIG. 1 shows the steps of a method for producing a large-area aircraft structural component from a composite material with a matrix made of a thermoplastic plastic material.

FIG. 1 shows the steps of a method for producing a large-area aircraft structural component 10 from a composite material with a matrix made of a thermoplastic plastic material. In the method, firstly a plurality of semi-finished product layers 12 are inserted into a first compression mould 14. The semi-finished product layers 12 contain undirectionally arranged carbon fibres which are provided with a surface layer made of a thermoplastic plastic material, for example polyetherketone, polyphthalamide or polyphenylene sulfide.

A first pressure-applying device 16, which drives the first compression mould 14, ensures that pressure is applied to the stacked semi-finished product layers 12. Before pressure is applied, however, the stacked semi-finished product layers 12 are fixed at particular points in their position in the first compression mould 14 and relative to one another in such a way that, while pressure is being applied to the semi-finished product layers 12 stacked in the first compression mould 14, a sliding movement of the semi-finished product layers 12 relative to one another and relative to the compression mould 14, preventing wrinkling in the semi-finished product layers 12, takes place. As a result, wrinkling in the semi-finished product layers 12 during the compression of the semi-finished product layers 12 is prevented.

In order to fix the semi-finished product layers 12 at particular points in their position in the first compression mould 14 and relative to one another, adhesively bonded connections 18 are produced at particular points by local fusing-on of the thermoplastic surface layers deposited on the reinforcing fibres of the semi-finished product layers 12. The adhesively bonded connections 18 at particular points are arranged in a central region and a marginal region of the semi-finished product layers 12.

The pressure applied to the stacked semi-finished product layers 12 via the first compression mould 14 is controlled by means of a control unit 20 in such a way that, during a first, initial pressure-applying phase, a pressure applied to the central region of the stacked semi-finished product layers 12 is higher than a pressure applied to the marginal region of the stacked semi-finished product layers 12. In particular, the pressure applied to the stacked semi-finished product layers 12 via the first compression mould 14 is controlled by means of the control unit 20 in such a way that, during the first pressure-applying phase the pressure applied to the stacked semi-finished product layers 12 decreases continuously from the central region of the stacked semi-finished product layers 12 in the direction of the marginal region of the stacked semi-finished product layers.

During a second pressure-applying phase following the first pressure-applying phase, the pressure applied to the stacked semi-finished product layers 12 is controlled by means of the control unit 20 in such a way that a pressure applied to the marginal region of the stacked semi-finished product layers 12 is increased in relation to the pressure applied to the marginal region of the stacked semi-finished product layers 12 during the first pressure-applying phase. In particular, the pressure applied to the stacked semi-finished product layers 12 via the first compression mould 14 is controlled by means of the control unit 20 in such a way that the pressure applied to the stacked semi-finished product layers during the second pressure-applying phase is increased continuously from the central region of the stacked semi-finished product layers 12 in the direction of the marginal region of the stacked semi-finished product layers 12. That is to say, during the second pressure-applying phase, a pressure distribution profile is produced over the surface of the semi-finished product layers 12 which enables a "smoothing out" of any wrinkles in the semi-finished product layers 12 in the direction of the marginal region of the semi-finished product layers 12.

The pressure applied to the stacked semi-finished product layers 12 is controlled by means of the control unit 20 in such a way that the pressure applied to the marginal region of the stacked semi-finished product layers 12 during the second pressure-applying phase is increased until it corresponds to the pressure applied to the central region of the semi-finished product layers 12 during the first pressure-applying phase. As a result, the semi-finished product layers are uniformly compressed over their entire surface.

During the pressure application, the stacked semi-finished product layers 12 are heated to a temperature of about 400° C. A suitable heating device 22 is provided for this purpose.

A cooling device 24 enables the cooling of the compressed semifinished product layers 12 in the first compression mould 14. After the cooling, the semi-finished product layers 12 compressed together are removed from the first compression mould and introduced into a second compression mould 26.

While the first compression mould 14 has plane compression plates, the second compression mould 26 is provided with curved compression plates, in order to bring the pre-compressed semi-finished product layers 12 into the desired curved shape. As with the first compression mould 14, the second compression mould 26 is also provided with a pressure-applying device 27, a heating device 28 for heating the precompressed semi-finished product layers 12 and a cooling device 30 for cooling the compressed semi-finished product layers 12 in the second compression mould 26. Furthermore, a control unit 31 for controlling the operation of the second compression mould 26 is provided.

After removal of the compressed semi-finished product layers 12 from the second compression mould 26, further semi-finished product layers 32 for producing a stiffening element 33 (see FIG. 2), for example a stringer or a frame, from a fibre-reinforced, thermoplastic plastic material are connected to the compressed semifinished product layers 12. For this purpose, the further semi-finished product layers 32 for producing a stiffening element after the compression of the semi-finished product layers 12 are deposited on a surface of the semi-finished product layers 12 compressed together. Subsequently, a contact region of the layers 12, 32 is locally heated by means of a suitable heating device 34, in order to connect the layers 12, 32 to one another.

Alternatively to this, the further semi-finished product layers 32 for producing a stiffening element 33 after the compression of the semi-finished product layers 12 can also be inserted into the second compression mould 26 and connected to the semi-finished product layers 12 by a separate compression step. Finally, a single-stage compression process is also conceivable, i.e. the further semi-finished product layers 32 for producing a stiffening element 33 and the semi-finished product layers 12 can also be connected to one another in a single compression step. In this case, a compression mould comprising a receiving space for receiving the further semifinished product layers 32 for producing a stiffening element 33 can be used. This enables a uniform application of pressure to all the semi-finished product layers 12, 32.

Figure 2:
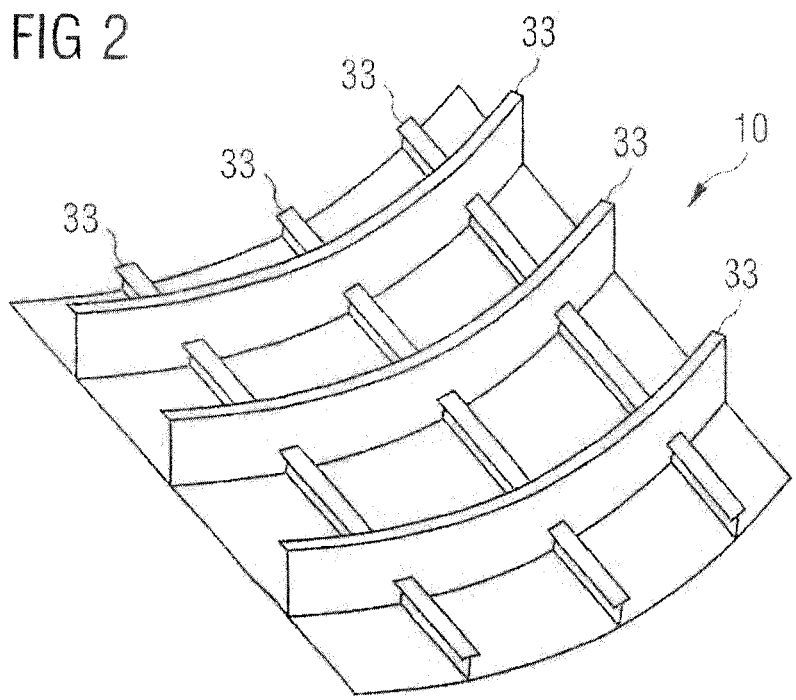
FIG. 2 shows an aircraft structural component produced by the method according to FIG. 1.

FIG. 2 shows an aircraft structural component 10 produced by the method according to FIG. 1. The component 10 is provided with integrated stiffening elements 33 in the form of stringers and frames.

Figure 3:
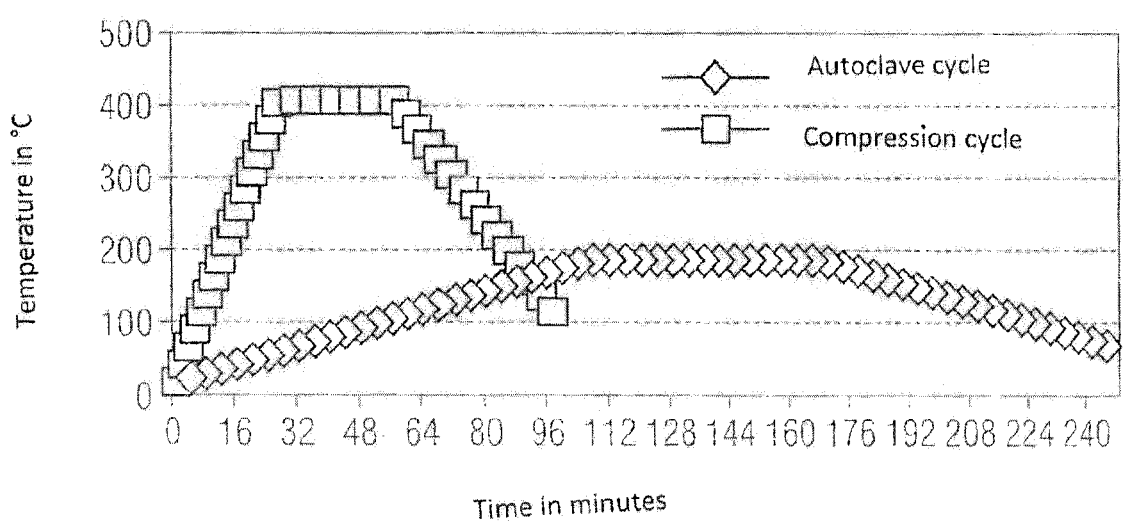
FIG. 3 shows a diagram comparing the process times of an autoclave cycle and a compression cycle.

The diagram according to FIG. 3 shows that the method according to FIG. 1 can be performed with a cycle time of about one hour. In comparison with this, the cycle times in the case of an autoclave process are about three hours.

The invention claimed is:

1. A method for producing an aircraft structural component comprising the steps of:
   (a) clipping together a plurality of semi-finished product layers for producing a component from a fibre-reinforced, thermoplastic plastic material,
   (b) introducing the plurality of the semi-finished product layers, clipped together in the step (a), into a first compression mould comprising plane compression plates, such that the plurality of the semi-finished product layers are clipped at particular points in their position in the compression mould, (c) applying pressure to the plurality of the semi-finished product layers introduced into the first compression mould in the step (b), (d) enabling, during the applying of the pressure and due to the clipping in at least one of the step (a) and the step (b), a sliding movement of the semi-finished product layers, at least in an area between said particular points, relative to at least one of (i) one another and (ii) the compression mould, and (e) removing the semi-finished product layers from the compression mould after the applying of the pressure, wherein said step (c) comprises a first pressure-applying phase, during the first pressure-applying phase a pressure applied to a central region of the stacked semi-finished product layers in said first compression mould is higher than a pressure applied to a marginal region of the stacked semi-finished product layers.

2. The method according to claim 1,
wherein the pressure applied to the stacked semi-finished product layers during the first pressure-applying phase decreases continuously or discontinuously from the central region of the stacked semi-finished product layers in the direction of the marginal region of the stacked semi-finished product layers.

3. The method according to claim 1,
wherein said step (c) further comprises a second pressure-applying phase following the first pressure-applying phase, during the second pressure-applying phase are introduced into a second compression mould where a pressure applied to the marginal region of the stacked semi-finished product layers is increased in relation to the pressure applied to the marginal region of the stacked semi-finished product layers during the first pressure-applying phase.

4. The method according to claim 3,
wherein the pressure applied to the stacked semi-finished product layers during the second pressure-applying phase is increased continuously or discontinuously from the central region of the stacked semi-finished product layers in the direction of the marginal region of the stacked semi-finished product layers.

5. The method according to claim 3,
wherein the pressure applied to the marginal region of the stacked semi-finished product layers during the second pressure-applying phase is increased until it corresponds to the pressure applied to the central region of the semi-finished product layers during the first pressure-applying phase.

6. The method according to claim 3, wherein the second compression mould comprises curved compression plates.

7. The method according to claim 1,
wherein the stacked semi-finished product layers are heated to a temperature of 300 to 500° C. while pressure is being applied and/or in that the semi-finished product layers are at least one of pre-fixed, heated, preshaped and preconsolidated before being introduced into the first compression mould.

8. The method according to claim 1,
wherein at least one semi-finished product layer for producing a stiffening element from a fibre-reinforced, thermoplastic plastic material is connected to the stacked semi-finished product layers for producing a component from a fibre-reinforced, thermoplastic plastic material.

9. The method according to claim 1, wherein the stacked semi-finished product layers are clipped, before pressure is applied, relative to one another in at least one of (i) a central region and (ii) a marginal region of the semi-finished product layers.

10. The method according to claim 1,
wherein the sliding movement facilitates preventing wrinkling in the semi-finished product layers.

11. A method for producing an aircraft structural component comprising the steps of:

(a) fixing together by a local fusing a plurality of semi-finished product layers for producing a component from a fibre-reinforced, thermoplastic plastic material, (b) introducing the plurality of the semi-finished product layers, locally fused together in the step (a), into a compression mould comprising plane compression plates, such that the plurality of the semi-finished product layers are locally fused at particular points in their position in the compression mould, (c) applying pressure to the plurality of the semi-finished product layers introduced into the compression mould in the step (b), (d) enabling, during the applying of the pressure and due to the fusing in at least one of the step (a) and the step (b), a sliding movement of the semi-finished product layers, at least in an area between said particular points, relative to at least one of (i) one another and (ii) the compression mould, and (e) removing the semi-finished product layers from the compression mould after the applying of the pressure, wherein said step (c) comprises a pressure applied to a central region of the stacked semi-finished product layers in said compression mould is higher than a pressure applied to a marginal region of the stacked semi-finished product layers.

12. The method according to claim 11,
wherein the sliding movement facilitates preventing wrinkling in the semi-finished product layers.

* * * * *